US012583296B2

(12) United States Patent
Tangitvet

(10) Patent No.: US 12,583,296 B2
(45) Date of Patent: Mar. 24, 2026

(54) AUTOMOBILE PICKUP BED ROOF

(71) Applicant: VANDAPAC CO., LTD., Chonburi (TH)

(72) Inventor: Varawong Tangitvet, Bangkok (TH)

(73) Assignee: VANDAPAC CO., LTD., Chonburi (TH)

( * ) Notice: Subject to any disclaimer, the term of this patent is extended or adjusted under 35 U.S.C. 154(b) by 293 days.

(21) Appl. No.: 18/037,912

(22) PCT Filed: Nov. 18, 2021

(86) PCT No.: PCT/TH2021/000069
§ 371 (c)(1),
(2) Date: May 19, 2023

(87) PCT Pub. No.: WO2022/164396
PCT Pub. Date: Aug. 4, 2022

(65) Prior Publication Data
US 2024/0001742 A1 Jan. 4, 2024

(30) Foreign Application Priority Data
Jan. 29, 2021 (TH) ................................ 2101000526

(51) Int. Cl.
B60J 1/00 (2006.01)
B60J 7/10 (2006.01)
(Continued)

(52) U.S. Cl.
CPC .............. B60J 7/106 (2013.01); B60J 1/007 (2013.01); B60J 7/0084 (2013.01); B60J 7/194 (2013.01)

(58) Field of Classification Search
CPC . B60J 1/007; B60J 1/006; B60J 1/1823; B60J 1/1876; B60J 1/1884; B60J 7/106;
(Continued)

(56) References Cited

U.S. PATENT DOCUMENTS 8,272,101 B2 * 9/2012 Wagner ..................... E05D 3/08
16/365
10,046,628 B1 8/2018 Fulton
(Continued)

FOREIGN PATENT DOCUMENTS

| CN | 206826378 U | 1/2018 |
| CN | 110753635 A | 2/2020 |
| CN | 210822004 U | 6/2020 |

OTHER PUBLICATIONS

ISR for International Application No. PCT/TH2021/000069 mailed Apr. 14, 2022.
(Continued)

*Primary Examiner* — Amy R Weisberg
*Assistant Examiner* — Wenwei Zhuo
(74) *Attorney, Agent, or Firm* — LADAS & PARRY LLP

(57) ABSTRACT

An automobile pickup bed has a roof fixing unit which attaches the pickup bed to the automobile pickup bed. The automobile pickup bed has a window panel fixing unit for attaching a door panel to the automobile pickup bed roof in order to be an entrance passage and has a supporting panel unit which locks the front window panel in the holding-open position for air ventilation. Further, the rear of the automobile pickup bed roof has a water drainage device to facilitate water drainage out of a groove of the rear door panel.

1 Claim, 10 Drawing Sheets

(51) Int. Cl.
| | |
|---|---|
| *B60J 7/00* | (2006.01) |
| *B60J 7/19* | (2006.01) |

(58) Field of Classification Search
CPC ....... B60J 7/141; B60J 7/1621; E05D 7/1011; E05D 7/121; E05D 3/02; E05D 5/0207; E05D 5/128; E05D 11/00

USPC .... 296/225, 100.06, 100.07, 100.08, 107.17, 296/216.02, 201, 146.11; 16/256, 258, 16/254
See application file for complete search history.

(56) References Cited

U.S. PATENT DOCUMENTS

| | | | | |
|---|---|---|---|---|
| 2010/0101054 A1* | 4/2010 | Cook | ........................ | E05D 5/04 |
| | | | | 16/382 |
| 2018/0118007 A1 | 5/2018 | Facchinello | | |
| 2019/0291554 A1 | 9/2019 | Ma | | |
| 2020/0148046 A1 | 5/2020 | Ma | | |
| 2021/0114445 A1* | 4/2021 | Deckard | ................ | B60J 7/1614 |
| 2022/0412140 A1* | 12/2022 | Young | ................... | E05D 7/1066 |

OTHER PUBLICATIONS

Written Opinion for International Application No. PCT/TH2021/000069 mailed Apr. 14, 2022.

* cited by examiner

100

1

3

4

2

SECTION A -A

A

A

1

2

2

AUTOMOBILE PICKUP BED ROOF

CROSS REFERENCE TO RELATED APPLICATIONS

This application is a U.S. National Stage Application under 35 U.S.C. § 371 of International Application No. PCT/TH2021/000069 which was filed on 18 Nov. 2021, which claims priority from TH application Ser. No. 2101000526 filed 29 Jan. 2021 the disclosures of which are incorporated in their entirety by reference herein.

FIELD OF THE INVENTION

Engineering related to an automobile pickup bed roof

BACKGROUND OF THE INVENTION

Recently pick-up truck type automobiles are widely used, both in transporting goods and as personal automobiles, which carry personal belongings in the pickup bed. However, due to weather and dust on the roads which can damage goods and personal belongings contained in the pickup bed, there is an introduction of a roof to be installed on the automobile's pickup bed. Typically, the automobile pickup bed roof installed to the automobile pick up bed is provided with a roof fixing unit, enabling the automobile pickup bed roof to be attached to the automobile pick up bed. Furthermore, the automobile pickup bed roof has a passenger entrance, an air ventilation, and water drainage, making the automobile pickup bed roof preferential.

Conventionally, in order to install the roof to a automobile pick up bed securely by a conventional roof fixing unit, one has to fasten a clamping arm to an upper edge fixing panel. Thus, installing of the conventional pickup bed fixing unit has to be done in piece-by-piece manner, and it is difficult to tighten and align these pieces into their proper positions.

A conventional hinge is composed of two panels connected to each other and has a connecting part as a pivoting point. The connection of the hinge with two panels connected together makes it difficult to dissemble, or even impossible to separate them apart. This makes it difficult to install or replace a window and a door panel when needed.

A conventional open-close device is used for installing a window to an automobile. The window is a sliding panel type which can be slid in order to open/close the window. However, when the automobile is travelling in a high speed, a resulted wind pushes the window to close. Furthermore, at the front window panel, vibration from the automobile's engine can make the window slide by itself. Also, in another conventional open-close device which comprise a shock absorber bar for pushing/pulling a window panel open or close, respectively. However, after being used for a period of times, the shock absorber bar will deteriorate and loss it strength so that it cannot keep the window panel open. In another conventional window open/close device, a window hinge with a spring loaded is used for open-close the window. When the loaded spring deteriorates due to fatigue, it will be difficult to push the window panel up.

A conventional waterproof rubber seal is a device for preventing water from penetrating into the pickup bed. This device receives water from a water drainage and trough around the rear door panel and discharge the water out of the pickup bed. However, said convention device cannot function properly when being used in some conditions, such as under heavy raining or under high pressure water during car washing, in which water can penetrate through connecting points of the edge backing rubbers if the attachment of the edge backing rubbers are not good enough.

SUMMARY OF THE INVENTION

A roof of an automobile pick up bed has a roof fixing unit which attaches the pickup bed to the automobile pick up bed and the automobile pick up bed has a hinge fixing unit for attaching the window panel or the door panel to the roof of the automobile pickup bed in order to be the entrance passage. The roof has an open-close device which locks the front window panel in a holding-up position for air ventilation. Also, the rear part of the roof of the automobile pickup bed is provided with a water drainage device to discharge water out of a groove of the rear door panel.

An objective of the present invention is to provide a device for installing the roof of an automobile pickup bed with safety and maximum utilization.

DETAILED DESCRIPTION

Figure 1:
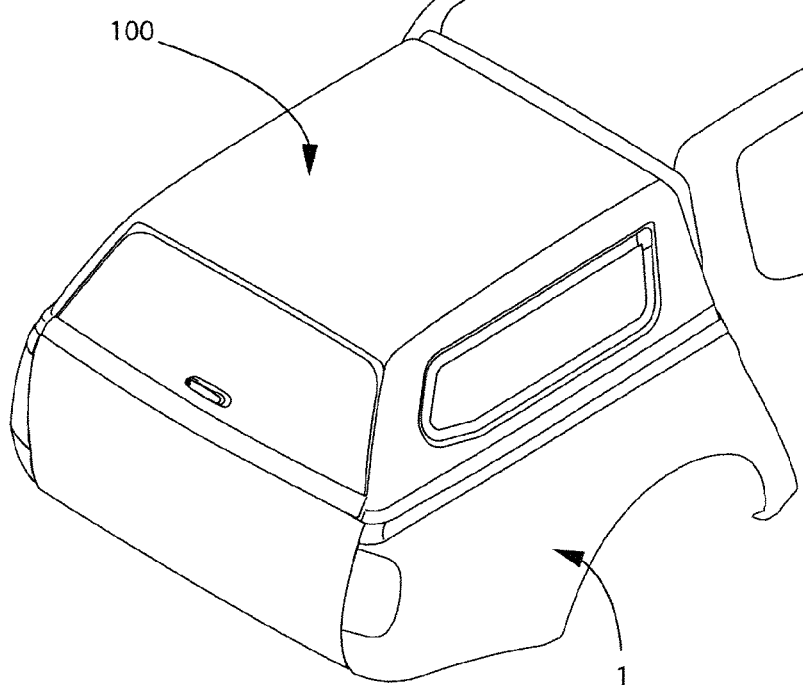
FIG. 1 shows a roof of an automobile pickup bed 100 installed to an automobile pick up bed 1.

FIG. 1 shows the automobile pickup bed roof 100 installed to the automobile pickup bed 1. The automobile pickup bed roof 100 covers the automobile pickup bed 1, safeguarding personal belonging or goods carried on the pickup bed against being damage by the weather or being stolen.

Figure 2:
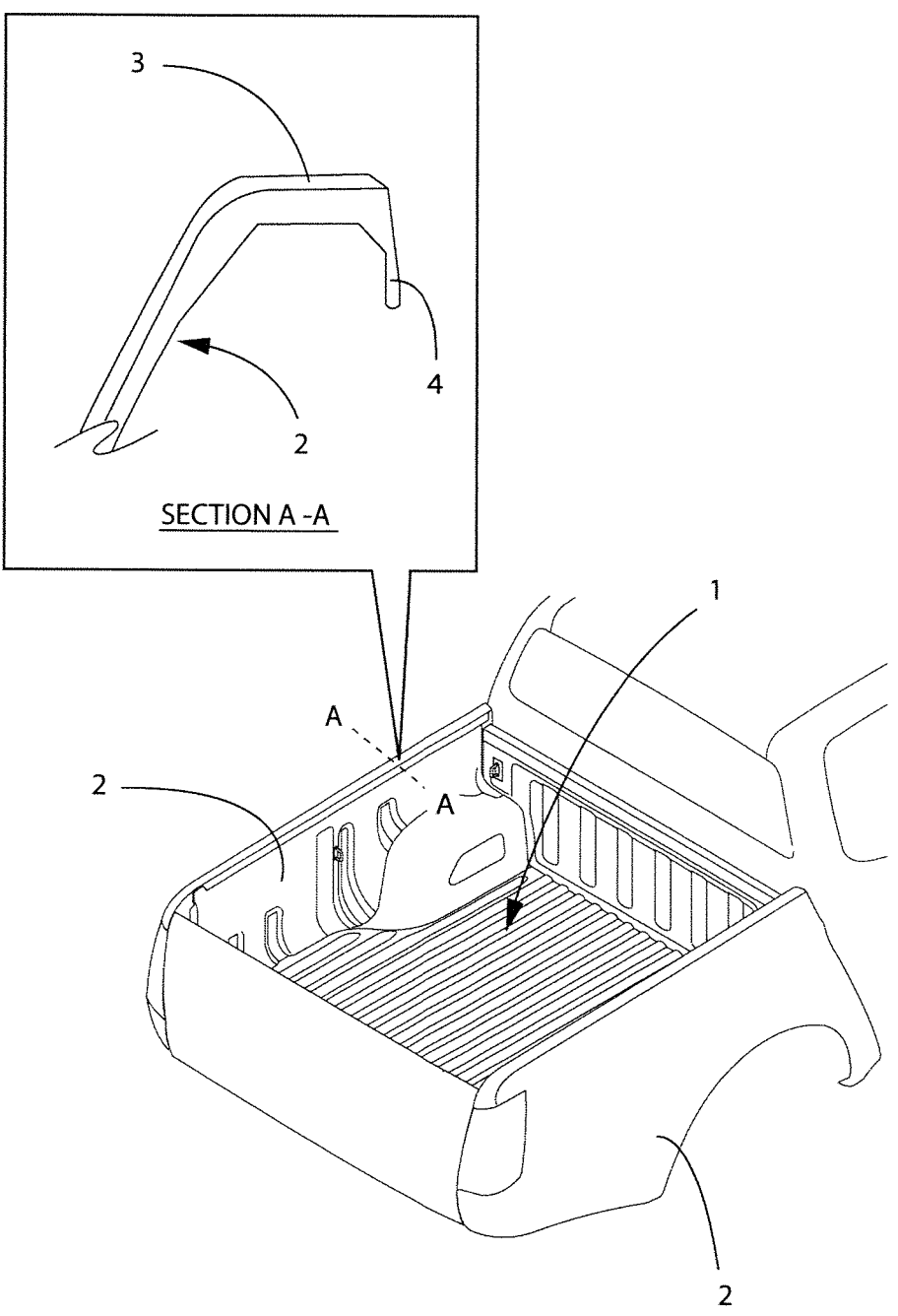
FIG. 2 shows the automobile pickup bed 1.

FIG. 2 shows the automobile pickup bed 1 onto which the automobile pickup bed roof 100 is fixed. The automobile pickup bed 1 comprises two side walls 2 opposed to each other, i.e. a left side wall and a right side wall, to which the automobile pickup bed roof 100 will be attached. The upper edge 3 of each of the side walls 2 includes an end part 4 pending downward and toward the inner of the pickup bed body. This is the part that will be clamped to the automobile pickup bed roof 100.

Figure 3:
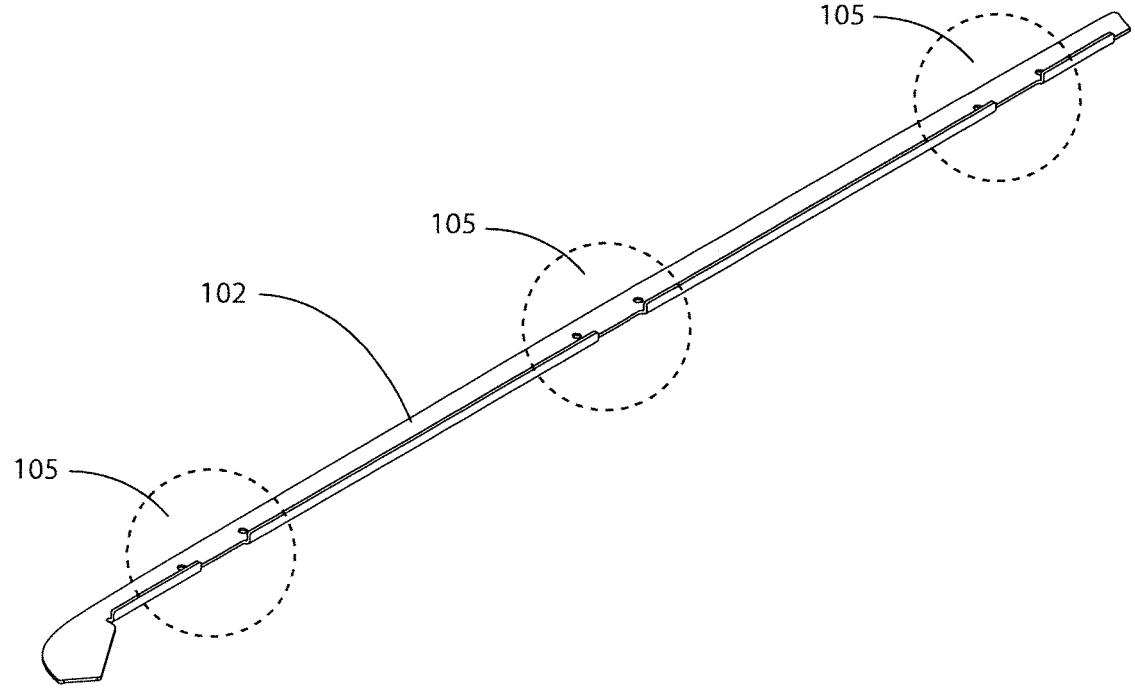
FIG. 3 shows a backing panel 102 of a pickup bed roof fixing unit 101.
Figure 4:
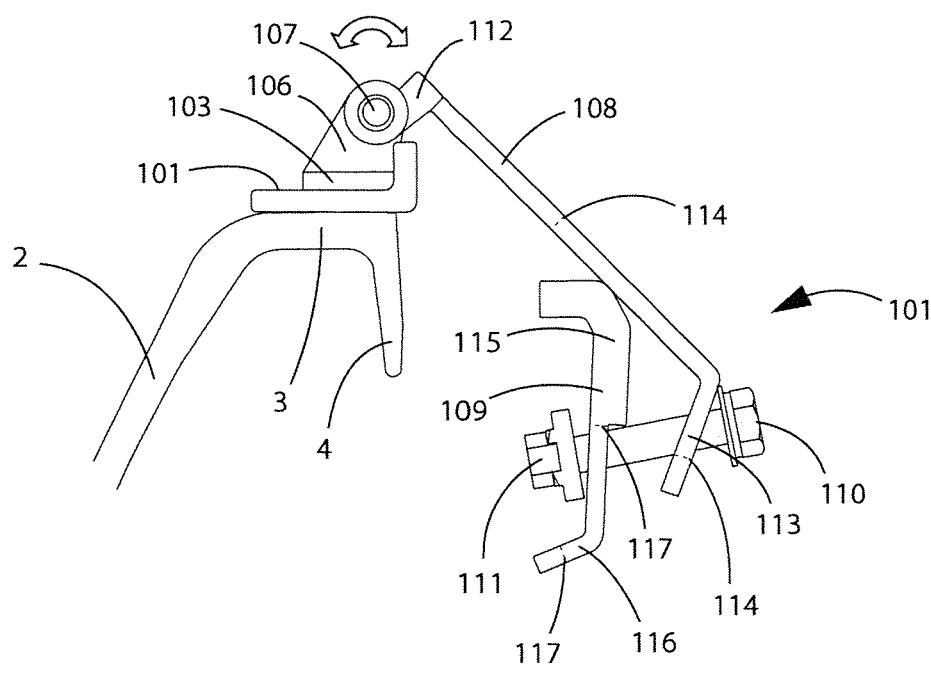
FIG. 4 shows an engagement view of the pickup bed roof fixing unit 101.
Figure 5:
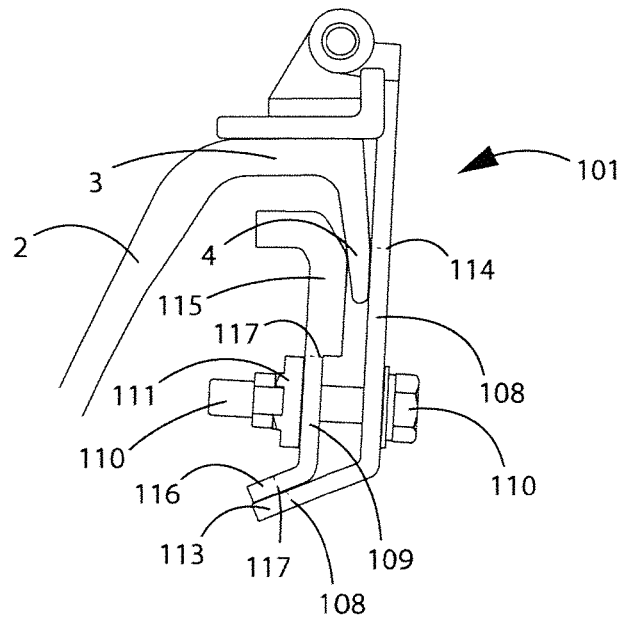
FIG. 5 shows another engagement view of the pickup bed roof fixing unit 101.

FIG. 3 to FIG. 5 show the automobile pickup bed roof 100 equipped with a pickup bed roof fixing unit 101 that is clamped and attached to the upper edge 3 of the side wall 2 in order to attach the automobile pickup bed roof 100 to the automobile pickup bed 1. The pickup bed roof fixing unit 101 comprises a backing panel 102, a plurality of crank base 103, and a plurality of fixing unit 104.

FIG. 3 shows the backing panel 102 which is in the form of a strip with one longitudinal edge folded upright as a high rise edge. The backing panel 102 is to be laid over the upper edge 3 of the side wall 2. The backing panel 102 is a base portion of the automobile pickup bed roof 100 when mounted on the upper edge 3 of the side wall 2 and attaches the automobile pickup bed roof 100 to the automobile pickup bed 1. The backing panel 102 has a part that supports attachment to the crank base 103. An attaching part 105 is in the form of a flat plate. At one edge of the attaching part 105 is a concave part being cut out in the high raised edge of the backing panel 102 which is used as the attachment to the fixing unit 104 is to be located in order to make the fixing unit 104 attached to the end part 4 of the side wall 2 securely.

The crank base 103 is in the form of a flat panel having a base portion that lays over and attaches to the attaching part 105 of the backing panel 102. The crank base 103 comprises two extending arms 106 extending up from the base portion. The extending arm 106 has a hole which is inserted by a rotating pin 107 which goes through and pivotally connects the fixing unit 104 to the crank base 103.

The fixing unit 104 is used for engaging with the end part 4 which is pending to the upper edge 3 of the side wall 2 in such a way that the automobile pickup bed roof 100 is attached to the automobile pickup bed 1 securely. The fixing unit 104 comprises a clamping arm 108, an engaging member 109, a thread stud 110 and a locking nut 111.

The clamping arm 108 is in the form of a plate which will be brought into close contact with the end part 4 at the upper edge 3 of the pickup bed. At one end of the clamping arm 108 there is a protruding part 112 with two legs. Each one of the two legs has a hole opposite to each other. The rotating pin 107 can be inserted to the two holes of the protruding part so that the clamping arm 108 will be pivotally coupled to the crank base 103. At the another end of the clamping arm 108, there is a sliding base 113, extending therefrom and being angled at a certain degree with respect to longitudinal axis of the clamping arm 108. The sliding base 113 functions as a base for movement of the engaging member 109 which can be moved toward and clamps the end part 4. The clamping arm 108 has an elongated slot 114 near its another end. The elongated slot is used for inserting the thread stud 110 in order to fasten it with the locking nut 111 in order to displace the engaging member 109 toward the clamping arm 108 and clamp the end part 4 therebetween.

The engaging member 109 is in the form of a plate that can move toward the clamping arm 108 in order to clamp the end part 4 of the upper edge 3 therebetween. The engaging member 109 is provided with a clamping part 115 at one of its ends. The clamping part 115 is used for clamping the end part 4. At the another end of the engaging member 109, there is a base 116 that comes into close contact and join with the engaging member 109. The base 116 is angled at a certain degree corresponding to that of the sliding base 113 of the clamping arm 108, such that the base 116 of the engaging member 109 can slide along the sliding base 113 of the clamping arm 108 thereby clamp the end part 4. The engaging member 109 has a longitudinal groove 117 running along its length which is used for inserting the thread stud 110. When the thread stud 110 is fastened with the locking nut 111, the engaging member 109 is moved toward the clamping arm 108 and thereby clamping the end part 4 at the upper edge of 3.

The thread stud 110 is in the form of a thread bar which is used for inserting into the groove 114 of the clamping arm 108 and the groove 117 of the engaging member 109 and tighten to the locking nut 111 in order to enable the engaging member 109 to slide to the clamping arm 108 and clamp to the end part 4 at the upper edge 3.

The locking nut 111 is in the form of a flat piece having a hole and is used for being inserted by and fastened with the thread stud 110. During fastened by the thread stud 110, the locking nut 111 will rotate following the rotation of the thread stud 110. While the locking nut 111 rotates, one end of the locking nut 111 will rotate accordingly and interlock with the base 116 of the engaging member 109 that is angled with a certain degree with respect to the engaging member 109. By this way, further rotation of the locking nut 111 is restricted, and it will no longer rotate with the thread stud 110. Thereby, the thread stud 110 is fastened to the locking nut 111 and makes the engaging member 109 moving toward the clamping arm 108 and finally clamp the end part 4 at the upper edge 3 of the side wall 2 securely.

Figure 6:
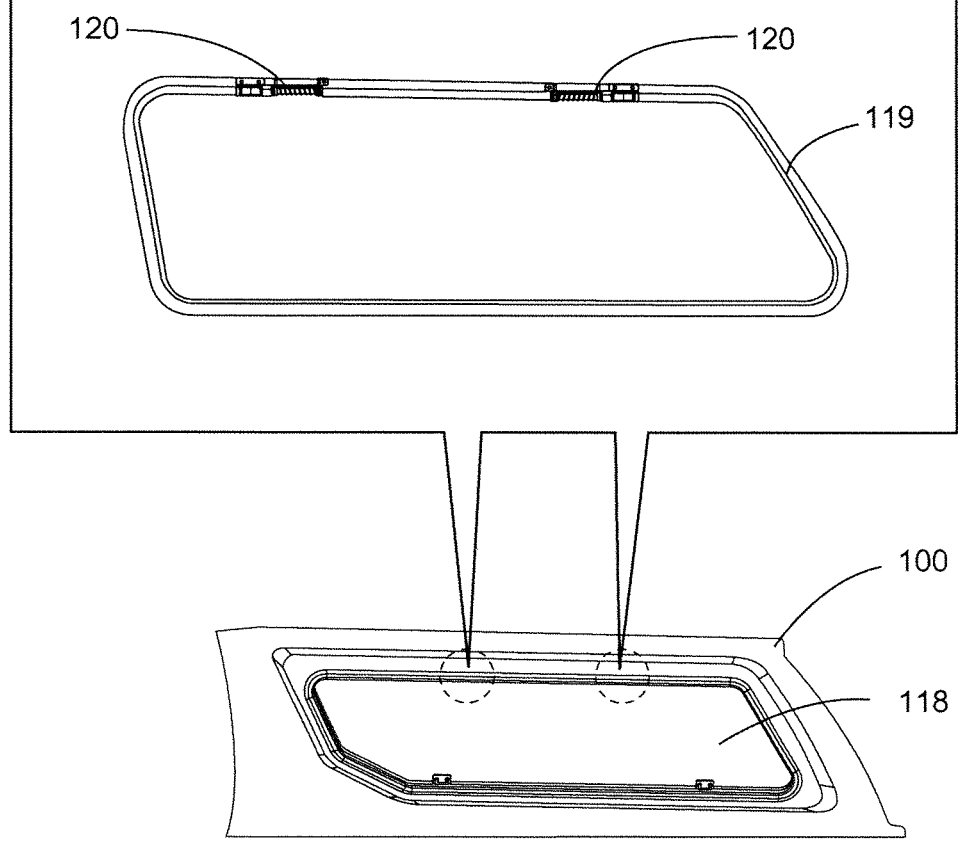
FIG. 6 shows the automobile pickup bed roof 100 with an entrance passage.

FIG. 6 shows the automobile pickup bed roof 100 with an entrance passage as a door panel or a window panel 118. The automobile pickup bed roof 100 is provided with a window frame 119, which provides support and attachment for the window panel 118, thus enabling the window panel 118 to be opened/closed. Hinge fixing units 120 are mounted on the window frame 119 in order to allow the window panel 118 to be hinged to the window frame 119 of the automobile pickup bed roof 100 securely. The hinge 121 is attached to the window panel 118 in such a way that one edge of the hinge 121 is attached to the window panel 118 and the other edge of the hinge 121, which is of a cylindrical shape having inside a longitudinal hole 122 along the length of the hinge enabling a pivot shaft of the hinge fixing unit 120 to be inserted into the hole and swingably attach the hinge 121.

Figure 7:
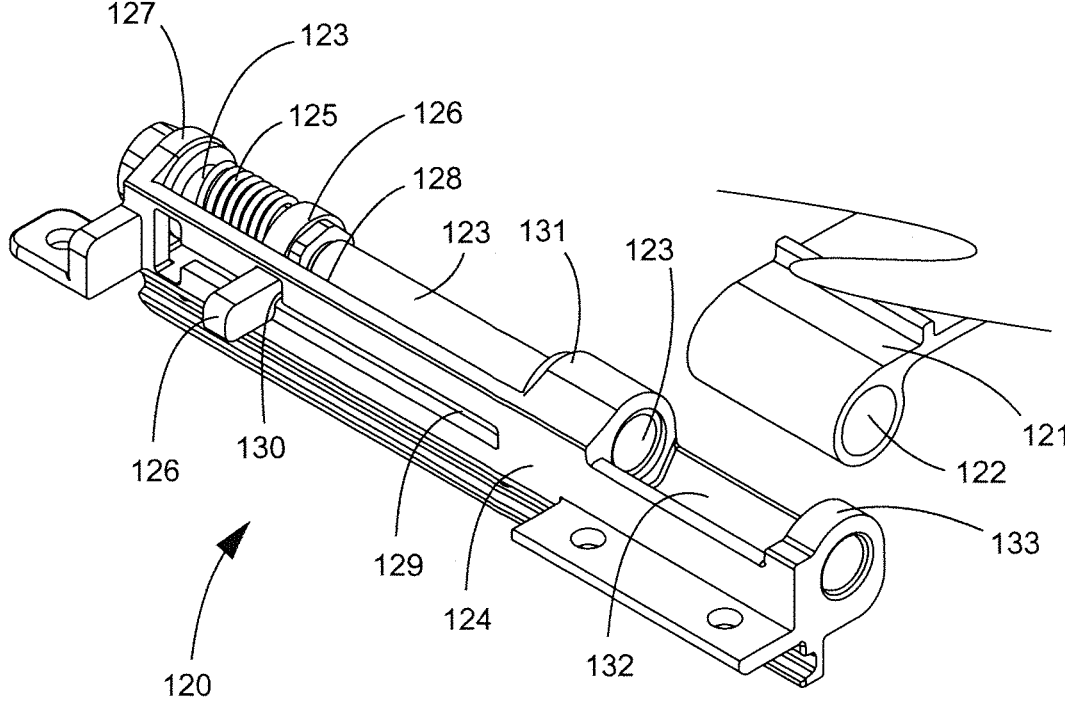
FIG. 7 shows a hinge fixing unit 120.

FIG. 7 shows details of the hinge fixing unit 120. The hinge 121 is attached to the window panel 118 in such a way that the window panel 118 can be fixed to the automobile pickup bed roof 100 by the hinge fixing unit 120. The hinge fixing unit 120 comprises an insertion rod 123, a body 124, a spring 125, and a latch 126

The insertion rod 123 is in the form of a pipe that can be slid over its length. The insertion rod 123 has one end being inserted into and attached thereto with the spring 125 and other part of the insertion rod 123 is inserted into and attached to the hinge 121. The insertion rod 123, the body 124, the spring 125, and the latch 126 are assembled all together as a unit. One part of the body 124 is attached to the window frame 119 of the automobile pickup bed roof 100. On a side of the body 124, there is an elongated through slot 129 extending from one end of the body to the other end. The insertion rod 123 is inserted into the inside of the body 124 from one end of the body. A first end rod fixing part 127 covers one end of the insertion rod 123. A spring fixing slot 128 is parallel to the latch sliding slot 129. A spring fixing slot 128 is for inserting a spring 125 into the spring fixing slot 128. The insertion rod 123 is inserted into the spring fixing slot 128 and abut against the spring 125 so that it is in a fixed position. The latch sliding slot 129 which is parallel to the spring fixing slot 128 is for guiding the latch 126 to move within the slot securely. At the other end of the latch sliding slot 129, there is provided with a groove 130 in which the latch 126 can be locked (in a release position) and cannot be moved by a biasing force of the spring 125. A mid-rod fixing part 131 is a part that covers and hold part of the insertion rod 123. This allows the insertion rod 123 to slide within the mid-rod fixing part back and forth securely. A hinge fixing slot 132 is provided at one end of the hinge 121 which has a hole 122 being aligned such that the hinge can be fitted in the hinge fixing slot 132 and the insertion rod 123 can slide into and secured with the hinge 121. A second end-rod fixing part 133 is a part that covers the other end of the insertion rod 123, enabling the insertion rod 123 to be inserted and held the hinge 121 within and slide into the inside of the second end-rod fixing part 133 securely.

The spring 125 is inserted into the spring fixing slot 128 while having the insertion rod 123 abutted against the spring 125 resulting in the spring staying in a stationary position. One end of the spring 125 abuts against a wall of the spring fixing slot 128 and the other end of the spring 125 attaches or abuts against the insertion rod 123.

The latch 126 is in the form of a piece or a bar having one end connected with one part of the insertion rod 123. The latch 126 is capable of sliding inside the spring fixing slot 128. The other end of the latch 126 protrudes outward from the latch sliding slot 129. The latch sliding slot 129 is arranged in parallel to the spring fixing slot 128. The end part of the latch that protrudes outside is for manipulation the latch by sliding it back and forth in order to insert the latch into the hinge 121.

Figure 8:
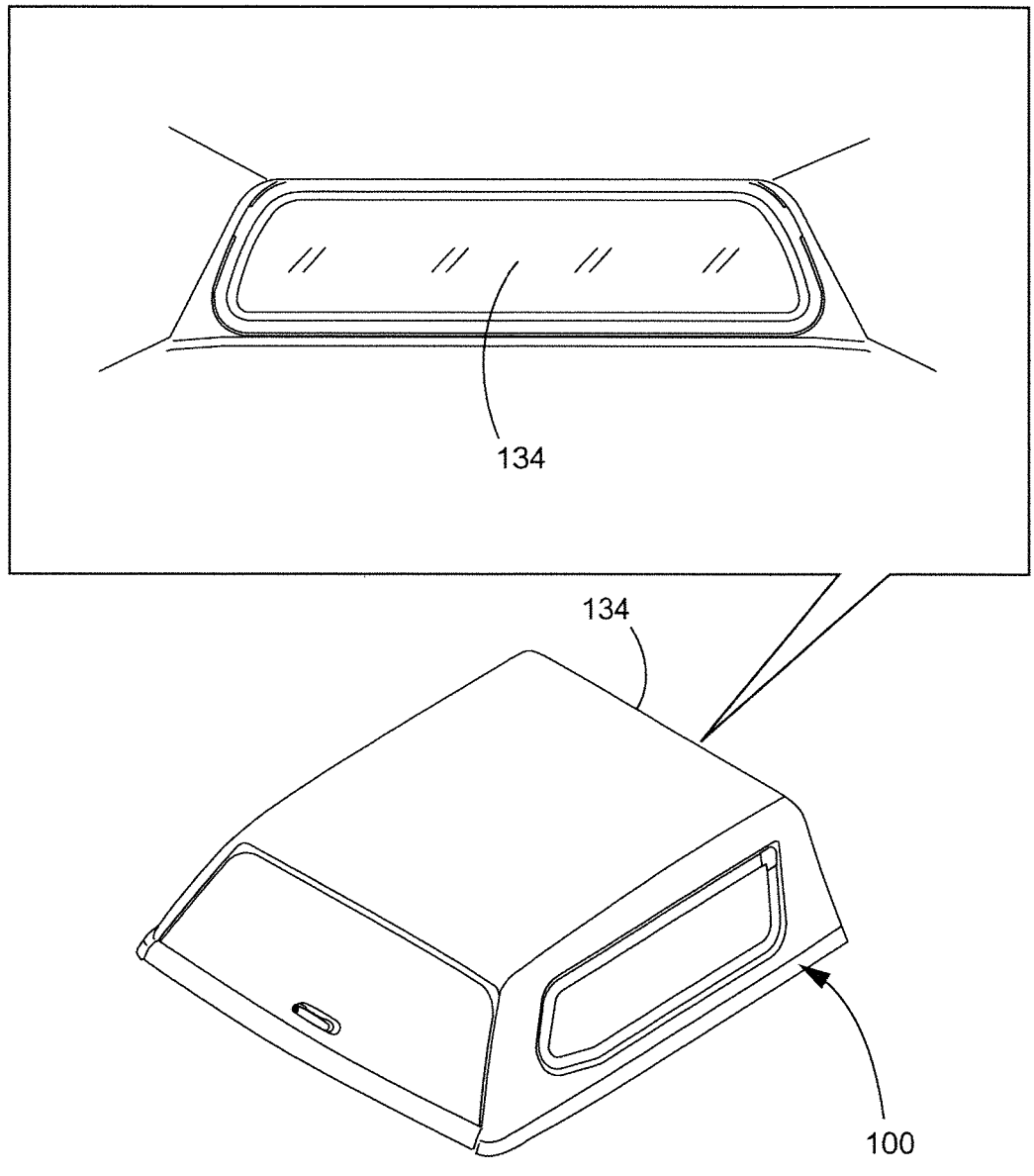
FIG. 8 shows the automobile pickup bed roof 100 with a front window panel 134.

FIG. 8 shows the automobile pickup bed roof 100 with a front window panel 134, which is an air ventilation passage. This also enhances visibility of the rear view. The front window panel 134 is mounted to a supporting panel unit 135 along its periphery.

Figure 9:
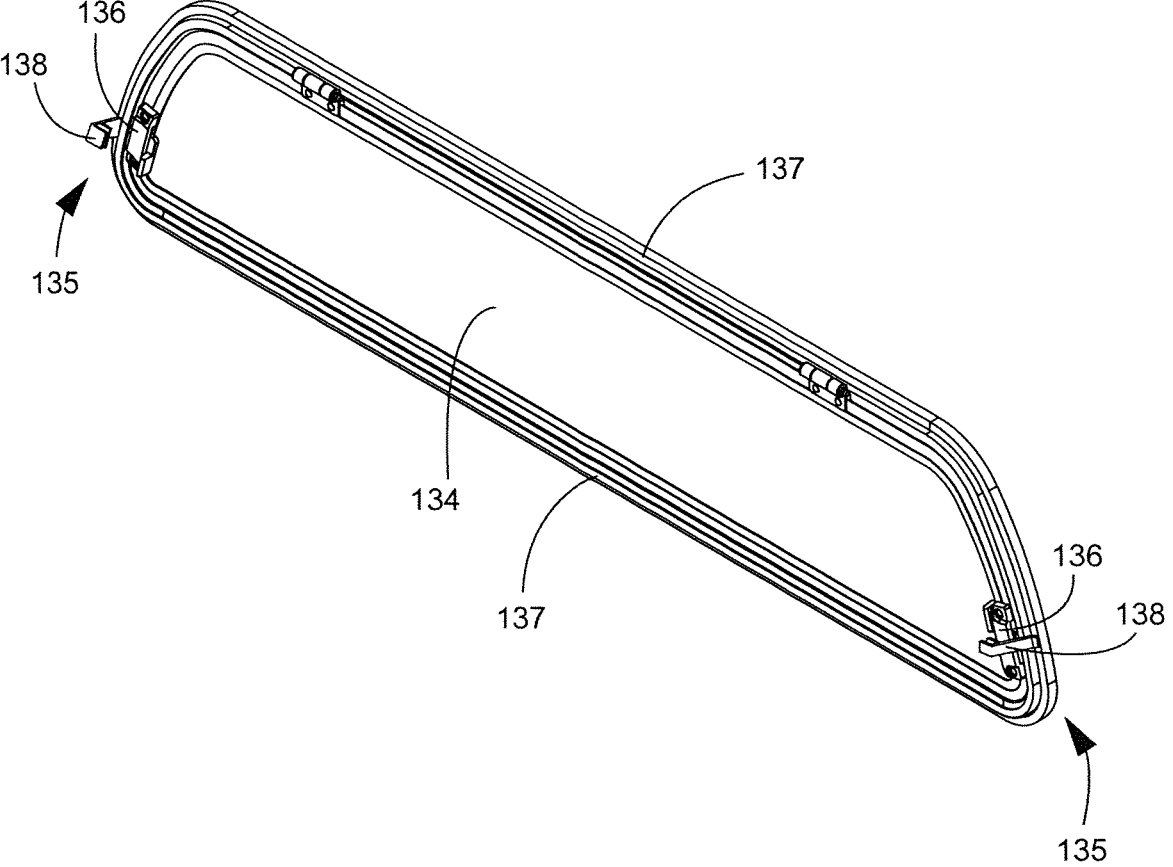
FIG. 9 shows a supporting panel unit 135 attached to the front window panel 134.

FIG. 9 shows details of the supporting panel unit 135 which is attached to the front window panel 134. There is at least one unit to be fixed to the peripheral position of the front window panel 134, enabling the front window panel 134 to be held open stably and to be shut tightly. The supporting panel unit 135 comprising a latching member 136, a window frame 137, and a holding member 138.

The latching member 136 is in the form of a latch that is capable of swinging back and forth for inserting and latching onto the window frame 137, or inserting and latching onto the holding member 138. The latching member is laid on and attached to the edge of the front window panel 134, which is on the same plane as that of the holding member 138. The latching member 136 can be swung in a back and forth manner. The latch is in the form of a plate being bent by a certain degree, thereby enabling it to be opened-closed in a predetermined angle. The bent section is pivotally connected to the fixing panel so that the other end part thereof can be swung about. When closing of the front window panel 134 is required, the other end part of the latching member is inserted into and latches onto the window frame 137. The other end part of the latching member is inserted into and latches onto the holding member 138, when hold opening of the front window panel 134 is required.

The window frame 137 is mounted to the front window panel 134 at inner edge region thereof by a plurality of the hinge fixing unit 120 fixed by the hinge 121. This enables the front window panel 134 to swingably connect to the window frame 137. The inner edge of the window frame 137 functions as a flexible supporting part for the front window panel 134 and restricts positioning of the front window panel 134 so as to stay in the predetermined position when being locked close to the window frame 137. The window frame 137 has an outer edge that extends beyond the edge of the front window panel 134, as it can be seen when the front window panel 134 is placed onto the covering supporting part. The outer edge is included a groove or a slot which the latch of the latching member 136 is inserted into and latch onto. This enables the front window panel 134 to lock with the window frame 137 securely.

The holding member 138 is in the form of a plate having one edge attached to the window frame 137 and the other edge being raised up for a certain height and having a slot or groove onto which the latch of the latching member 136 latches. This enables the latch to be inserted into and latch onto the holding member 138. The holding member 138 is attached to the window frame 137 at a position that is in a path of movement of the latching member 136 attached to the front window panel 134 so that the front window panel 134 can be swung up to open. As a consequence, the latching member 136 will move correspondingly. When the front window panel 134 is open to a predetermined degree, the latching member 136 will be swung and the one end of the latch is inserted into and latch onto the groove of the holding member 138 so as to hold the front window panel 134 open with respect to the window frame 137 firmly.

Figure 10:
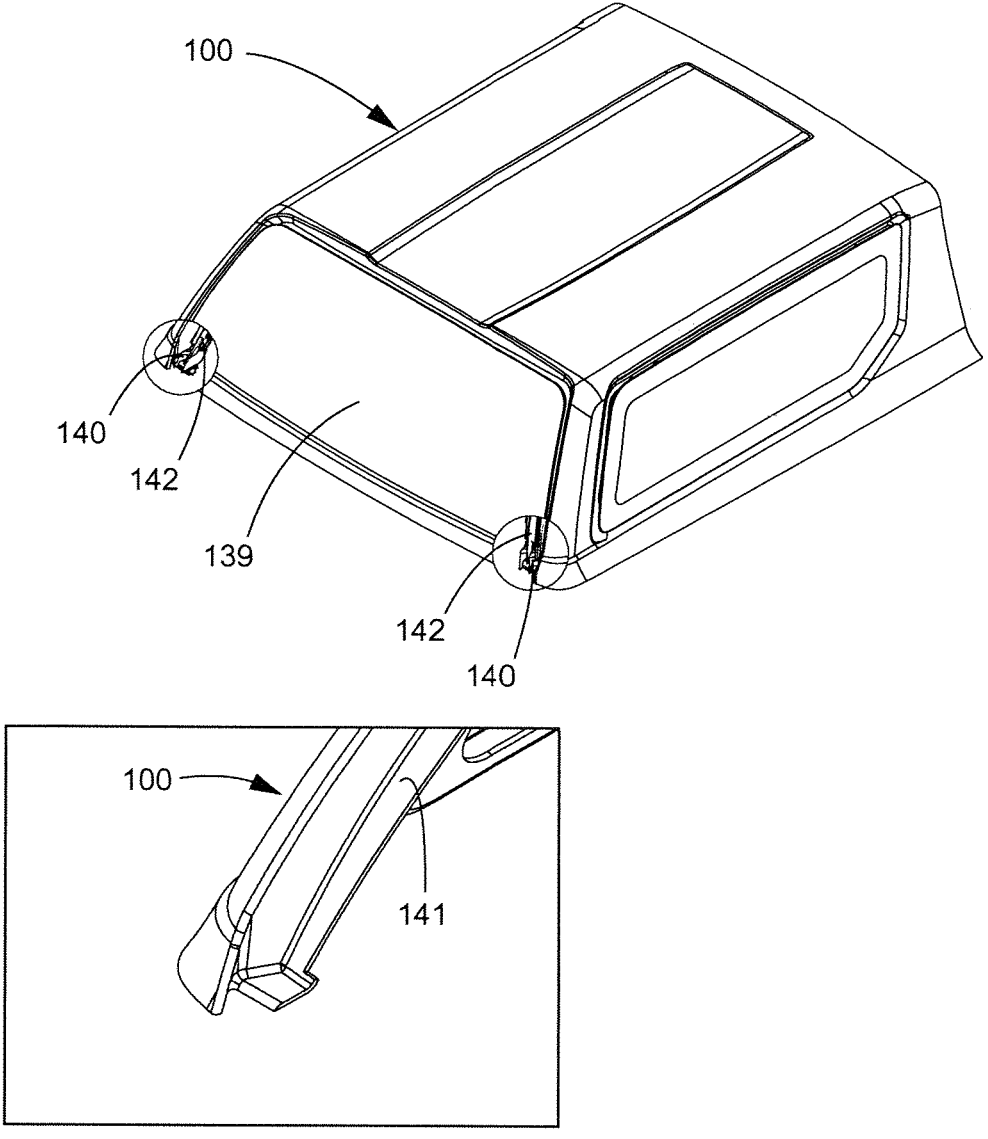
FIG. 10 shows the automobile pickup bed roof 100 with the rear door panel 139 to be installed on the automobile pick up bed 1.

FIG. 10 shows the automobile pickup bed roof 100 to be installed to the automobile pickup bed 1. The automobile pickup bed roof 100 has a rear door panel 139 which is an entrance passage. The rear door panel 139 is capable of being swung back and forth for the rear door panel 139 to be swung open or close. Consequently, swing open-close manner like this causes water from rain or washing to engrave or penetrate into some junctions of parts of the rear door panel 139 into inside of the automobile pickup bed 1. Therefore, a water drainage device 140 is required to be installed, especially in vicinity of edge area of the rear door panel 139. A groove 41 is introduced in the peripheral area so that water can be drained via the groove 141. Edge of the roof supports the rear door panel 139 with an edge supporting rubber 142 attached thereon. The water drainage device 140 is installed to prevent water that flow in the groove 141 around the edge of the rear door panel 139 from entering into the inside, and to drain the water to the outside of the automobile pickup bed 1.

Figure 11:
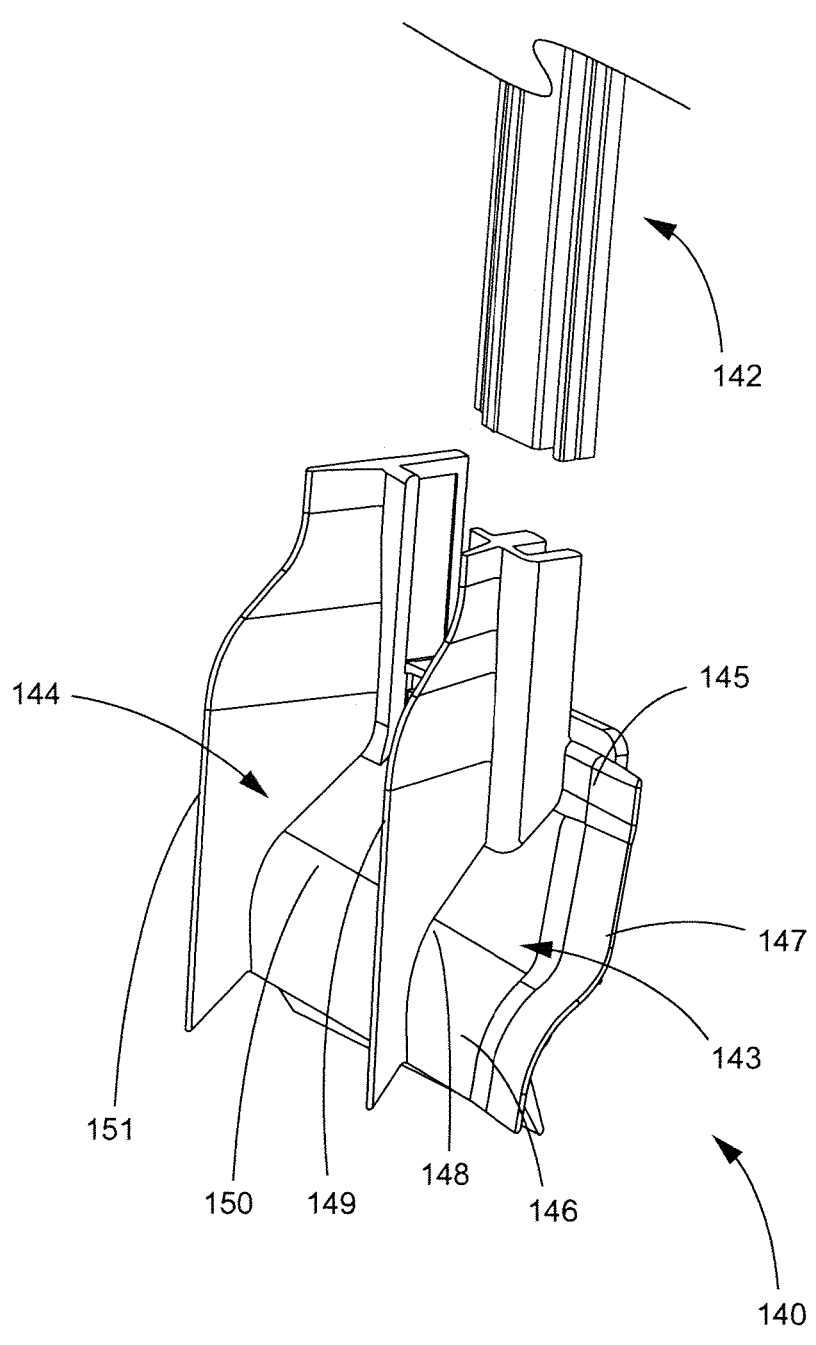
FIG. 11 shows a water drainage device 140.

FIG. 11 shows details of the water drainage device 140 to be installed on the automobile pickup bed roof 100. The water drainage device 140 include a rigid or flexible base made of material such as polymer, rubber or plastic, or metal such as, iron or alloy that is formed by any suitable forming method for the respective material. The water drainage device 140 comprises an edge portion 143 and a water drainage portion 144.

The edge portion 143 is in the form of a panel that spreads outward from one side of the water drainage portion 144 to make a close contact with the edge of the rear door panel 139 of the automobile pickup bed roof 100 so that water flowing along the groove 141 around the edge of the rear door panel 139 will flow to the edge portion 143 and be drained outside the automobile pickup bed 1. The edge portion 143 is an outer water drainage part that receives water from the groove 141 and the edge of the rear door panel 139 in order to drain the water out of the automobile pickup bed 1 as rapidly as possible. The edge portion 143 comprises an upper water receiving part 145, a lower water receiving base 146, an outer edge 147 and an inner edge 148.

The upper water receiving part 145 is a part that comes into close contact with the rear door panel 139 and the groove 141 in order to receive water flowing along the groove 141 and the edge of the rear door panel 139 to direct water to the lower water receiving base 146 and then flow out to outside of the automobile pickup bed 1.

The lower water receiving base 146 is higher than the upper water receiving part 145 so that it will expose itself to the outside of the automobile pickup bed 1.

The outer edge 147 is lower than the inner edge 148 in order to fit and contact tightly with the edge of the rear door panel 139 and the groove 141.

The inner edge 148 is connected to a side of the water drainage portion 144 which is fixed to the edge supporting rubber 142.

The water drainage portion 144 is a part that supports the attachment of the edge supporting rubber 142 and is a part that drains water flowing along the edge of the rear door panel 139 and the edge supporting rubber 142 to the water drainage portion 144. The water drainage portion 144 is composed of an outer water proof wall 149, a water receiving base 150, and an inner water proof wall 151.

The outer water proof wall 149 is a part connected to the edge portion 143 in order to prevent water flowing from the edge portion 143 from entering to inside too much. Otherwise the overflow may enter into the inside of the automobile pickup bed 1. The outer water proof wall 149 has a slot for inserting and fixing the side edges of the edge supporting rubber 142 in order to fix the edge supporting rubber 142 in a secure position. The outer water proof wall 149 at one edge is connected to the edge portion 143 which is the outer drainage area, and at the other edge is connected to the water receiving base 150.

The water receiving base 150 is a part that receives water flowing from the edge supporting rubber 142, and allow it to flow to the outside of the automobile pickup bed 1. The water receiving base 150 has a slot into which the edge supporting rubber 142 is inserted and fixed. The water receiving base 150 further has a slot with which the front part of the edge supporting rubber 142 is engaged firmly. One edge of the water receiving base 150 is connected to the outer water proof wall 149 and at the another edge of the water receiving base 150 is connected to the inner water proof wall 151.

The inner water prevention wall 151 is in the form of a vertical wall or a partition extending from the water receiving base 150. The inner water proof wall 15 is located inside of the pickup bed in order to prevent water flowing from the water receiving base 150 from entering the automobile pickup bed 1. The inner water proof wall 151 has a slot for inserting and fixing of the side edge of the edge supporting rubber 142 in order to fix the edge supporting rubber 142 into its position firmly.

The water drainage device 140 attached to the rear door panel 139 of the automobile pickup bed roof 100 has, on its underside, a slot such that the edge of the rear door panel 139 can be inserted into the slot and fixed with the water drainage device 140. Thereby, the water drainage device 140 can be attached to edge of the rear door panel 139 of the automobile pickup bed roof the 100 securely.

BEST MODE FOR CARRYING OUT THE INVENTION

As stated above in the detailed description of this application.

The invention claimed is:

1. An automobile pickup bed roof (100) with an entrance passage as a door panel or window panel (118), having a hinge fixing unit (120) mounted on a window frame (119) of the automobile pickup bed roof (100) and fixing a hinge (121) attached to the window panel (118) enabling the window panel (118) to be opened and closed, wherein the hinge fixing unit (120) comprising an insertion rod (123), a body (124), a spring (125), and a latch (126), is characterized by: the insertion rod (123) is in the form of a pipe that can be slid over its length, wherein the insertion rod (123) has one end being inserted and attached thereto with the spring (125) and other part of the insertion rod (123) is inserted and attached to the hinge (121), the insertion rod (123), the body (124), the spring (125), and the latch (126) are assembled all together as a unit, whereby one part of the body (124) is attached to the window frame (119) of the automobile pickup bed roof (100), on a side of the body (124), there is a through hole extending from one end of the body to the other end, the insertion rod (123) is inserted into the inside of the body (124) from one end of the body, a first end rod fixing part (127) covers one end of the insertion rod (123), a spring fixing slot (128) is for inserting the spring (125) into the spring fixing slot (128), the insertion rod (123) is inserted into the spring fixing slot (128) and abut against the spring (125) so that it is in a fixed position, a latch sliding slot (129), which is parallel to the spring fixing slot (128) is for guiding the latch (126) to move within that slot securely, at the other end of the latch sliding slot (129), there is provided with a groove (130), in which the latch (126) can be locked and cannot be moved by a biasing force of the spring (125), a mid-rod fixing part (131) is a part that covers and holds part of the insertion rod (123), allowing the insertion rod (123) to slide within the mid-rod fixing part back and forth securely, a hinge fixing slot (132) is provided at one end of the hinge (121), which has a hole (122) being aligned such that the hinge can be fitted in the hinge fixing slot (132), allowing the insertion rod (123) to slide into and secure with the hinge (121), a second end-rod fixing part (133) is a part that covers the other end of the insertion rod (123); the spring (125) is inserted into the spring fixing slot (128), while having the insertion rod (123) abutted against the spring (125) resulting in the spring staying in a stationary position, whereby one end of the spring (125) abuts against a wall of the spring fixing slot (128) and the other end of the spring (125) attaches or abuts against the insertion rod (123); the latch (126) having one end connected with one part of the insertion rod (123), the latch (126) is capable of sliding inside the spring fixing slot (128), the other end of the latch (126) protrudes outward from the latch sliding slot (129), wherein the latch sliding slot (129) is parallel to the spring fixing slot (128), the end part of the latch that protrudes outside is for manipulation the latch by sliding back and forth.

* * * * *